US012795724B2

(12) United States Patent
Loukianov

(10) Patent No.: US 12,795,724 B2
(45) Date of Patent: Nov. 10, 2026

(54) SYSTEMS AND METHODS OF COORDINATED DATA PACKET TRANSMISSION ON MULTI-POINT WIRELINE OR OPTICAL SHARED PHYSICAL MEDIA

(71) Applicant: Avago Technologies International Sales Pte. Limited, Singapore (SG)

(72) Inventor: Dmitrii Loukianov, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 705 days.

(21) Appl. No.: 17/977,483

(22) Filed: Oct. 31, 2022

(65) Prior Publication Data

US 2024/0147529 A1 May 2, 2024

(51) Int. Cl.

| | |
|---|---|
| ***H04W 74/0816*** | (2024.01) |
| ***H04L 12/403*** | (2006.01) |
| ***H04L 41/12*** | (2022.01) |
| ***H04L 47/10*** | (2022.01) |
| ***H04L 47/56*** | (2022.01) |
| ***H04L 47/70*** | (2022.01) |

(52) U.S. Cl.

CPC ....... *H04W 74/0816* (2013.01); *H04L 12/403* (2013.01); *H04L 41/12* (2013.01); *H04L 47/13* (2013.01); *H04L 47/135* (2013.01); *H04L 47/566* (2013.01); *H04L 47/70* (2013.01)

(58) Field of Classification Search

CPC ... H04L 47/135; H04L 47/566; H04L 12/403; H04L 47/13; H04L 47/70; H04L 41/12; H04W 74/0816

See application file for complete search history.

(56) References Cited

U.S. PATENT DOCUMENTS

| | | | | |
|---|---|---|---|---|
| 6,704,280 | B1 * | 3/2004 | Mangin | H04L 47/266 370/232 |
| 9,325,618 | B1 * | 4/2016 | Yonge, III | H04L 47/10 |
| 10,925,097 | B2 | 2/2021 | Beruto et al. | |
| 2003/0169711 | A1 * | 9/2003 | Borowski | H04L 27/0014 370/503 |
| 2005/0129036 | A1 * | 6/2005 | Sawabe | H04L 47/135 370/445 |
| 2010/0020770 | A1 * | 1/2010 | Qin | H04N 21/2408 370/461 |
| 2011/0149785 | A1 * | 6/2011 | Oksman | H04L 12/403 370/252 |

(Continued)

FOREIGN PATENT DOCUMENTS

EP 0760185 B1 * 10/2004

*Primary Examiner* — Moo Jeong

(74) *Attorney, Agent, or Firm* — Foley & Lardner LLP

(57) ABSTRACT

A media access control layer (MAC) or device for shared bus network system for collision-less data packet transmission, the media access control layer includes a transmission controller, priority queues, timestamper, and optional coordinator packet generator. The transmission controller is configured to decode a coordination packet received from the physical layer. The transmission controller is further configured to extract control information from the coordination packet. The transmission controller is further configured to generate a data packet transmission schedule and allocate non-overlapping time intervals to transmit the plurality of data packets with collision avoidance.

20 Claims, 10 Drawing Sheets

(56) References Cited

U.S. PATENT DOCUMENTS

| | | | | |
|---|---|---|---|---|
| 2014/0313975 | A1* | 10/2014 | Berenberg | H04W 12/08 370/328 |
| 2016/0007368 | A1* | 1/2016 | Moon | H04W 56/00 370/329 |
| 2018/0124206 | A1 | 5/2018 | Sollacher | |
| 2019/0230705 | A1* | 7/2019 | Beruto | H04J 3/0652 |
| 2020/0221362 | A1* | 7/2020 | Kessler | H04W 36/305 |

* cited by examiner

SYSTEMS AND METHODS OF COORDINATED DATA PACKET TRANSMISSION ON MULTI-POINT WIRELINE OR OPTICAL SHARED PHYSICAL MEDIA

FIELD OF THE DISCLOSURE

This disclosure generally relates to systems and methods for communication and data transmission, including but not limited to systems and methods for data packet transmission on a wired connection such as multi-point wireline or optical shared physical media

BACKGROUND

Data transmission networks are used to transmit data packets. Specifically, the topology of the network can be generalized as a bus with taps to which the network nodes are attached. For example, network topologies such as RS485 networks, passive optical networks and traditional 10Base-5 and 10Base-1TS Ethernet may be used to transmit data packets. The nodes on such networks monitor the traffic on the network to detect "silence" for safe transmission, but still when attempting to transmit data packets, the nodes may experience errors because the data packets may collide on the network. Ethernet network systems may implement data collision detection systems (e.g., carrier-sense multiple access with collision detection (CSMA/CD), etc.).

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1A:
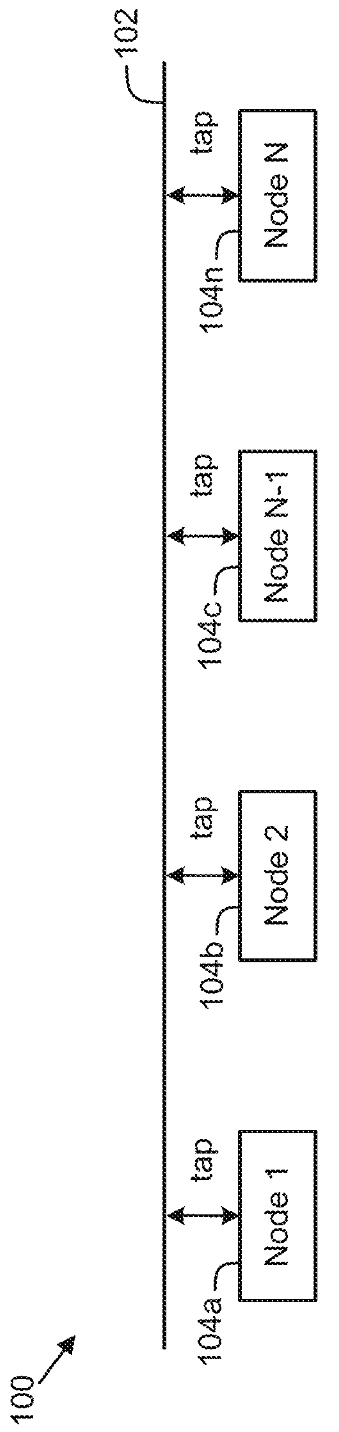
FIG. 1A is a schematic block diagram of a bus physical media network topology, in accordance with some embodiments.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, embodiments in which the first and second features are in direct communication may also include embodiments in which additional features may be between the first and second features, such that the first and second features may not be in direct communication. In addition, the present disclosure may repeat reference numerals and/or letters in the various examples. This repetition is for the purpose of simplicity and clarity and does not in itself dictate a relationship between the various embodiments and/or configurations discussed.

Various embodiments disclosed herein are related to coordinated data packet transmission systems and methods which detect and mitigate collisions between data packets being transmitted on the same network. Data packet transmission may refer to transmitting data packets between different layers or nodes of a network. A data packet may refer to a unit of data made into a single package or container that may be transmitted within a communication network in some embodiments. In some embodiments, the network may be on a multi-point wireline or optical shared physical media. Some embodiments disclosed herein are directed to a coordinated data packet transmission system which includes a media access control (MAC) layer and a physical interface (PHY) layer which are configured to facilitate the transmission of data packets while avoiding collisions between data packets. The MAC layer is a layer within the network which controls the hardware responsible for interaction with a wired, optical, or wireless transmission medium. The MAC layer is responsible for flow control and multiplexing for the transmission medium in some embodiments. The nodes on the transmission medium may monitor the traffic on the network, and when attempting to transmit data packets, may experience errors because the data packets may collide on the network. The nodes may be defined as tap points within a communication network. Each node can be an endpoint for data transmissions or redistribution. Nodes can be configured to recognize, process and forward transmissions to other network nodes.

In some embodiments, the coordinated data packet transmission system solves or mitigates the problem of collisions and traffic prioritization by introducing traffic management and access protocol implemented in the MAC layer of the network nodes which help coordinate the transmission of data packets and scheduling of the transmit opportunities for each node on a shared network segment. In some embodiments, a transmit opportunity may refer to the time interval when one or more nodes may safely transmit a data packet.

These intervals are coordinated with a reference to Frame Start Markers generated by one or more MAC units acting as coordinators in some embodiments. The MAC layer can be implemented by any circuit including pure fixed hardware or a programmable processor with software configured to provide communication flow control in some embodiments.

The coordinated data packet transmission system may use a physical media dependent (PMD) transceiver with the ability to detect and report an idle state and collisions on the network and allow the MAC to make a decision on when to attempt packet transmission in some embodiments. The PMD receives and transmits arbitrary data packets using the modulation technique and data formats allowed at the PMD level.

One embodiment relates to a device which includes a transmission controller. The transmission controller may be structured to receive a coordination packet from a network medium. The transmission controller may be structured to obtain information from the coordination packet. The transmission controller may be further configured to provide a data packet transmission schedule configured to allocate non-overlapping times to transmit a number of data packets in response to the information from the coordination packet. A network medium may refer to physical media over which network signals are transmitted or received including but not limited to wires, coaxial cable, transmission line, optical fiber, air, or space (e.g., open space).

In some implementations, the transmission controller may be further configured to act as a network coordinator. A network coordinator may refer to a node that provides schedules or other information for managing communication on the network in some embodiments. A node may refer to a device capable of communicating in a network in some embodiments. In some implementations, the coordination packet includes a transmit opportunity for one or more nodes associated with the network system. In some implementations, the coordination packet specifies a prioritization scheme for the transmit opportunity for the one or more nodes associated with the network system. A prioritization scheme for the transmit opportunity may refer to an order or process for assigning an order for the transmit opportunities and nodes. In some implementations, the coordination packet describes a jamming mechanism which is configured to initiate controlled collisions in response to at least the prioritization scheme. In some implementations, the prioritization scheme elevates a priority of one or more data packet based on a duration of time spent in a transmit queue. In some implementations, the transmission controller may be further configured to collect usage statistics for each node to detect a duration and use of a transmit interval and temporarily exclude a transmit opportunity for selected nodes by implementing the jamming mechanism to preempt the monopolization of network bandwidth. A transmit interval may refer to a time period for transmitting a data packet in some embodiments.

In some implementations, the coordination packet comprises at least one of a synchronization pattern, a Frame Start Marker code, a start identification number, a transmit opportunity identification map, a time stamp, and an error correction code. In some implementations, a transmission controller configured to utilize a high reliability data pattern detector in the form of a matched filter and an error correction unit to obtain the information. In some implementations, the transmission controller is configured to detect a duration of a transmit opportunity and match a node ID with a source MAC address of a node of the one or more nodes associated with the network system to identify a network client. The information can be control information including but not limited to priority schemes, transmit ID map (which defines nodes that are allowed to transmit), a minimum priority level above which the MAC or other device will release the packet to a network, the destination address/port or group of addresses which enable transmission, the size of the data packets which are currently allowed to be transmitted, and/or other packet attributes or parameters.

One embodiment relates to a method. The method includes receiving, by a transmission controller, a coordination packet. The method further includes obtaining information from the coordination packet. The method further includes providing, by the transmission controller, a transmission schedule configured to allocate non-overlapping times using the information from the coordination packet. The method further includes transmitting, by the transmission controller, a data packet according to the transmission schedule.

In some implementations, transmission controller further comprises an encoder configured to encode and transmit the coordination packet. In some implementations, the coordination packet describes a transmit opportunity for one or more nodes associated with a network system. In some implementations, the method further includes collecting, by the transmission controller, usage statistics for each node to detect a duration and use of a transmit interval. In some implementations, the method further includes temporarily excluding, by the transmission controller, a transmit opportunity for selected nodes by implementing the jamming mechanism to preempt the monopolization of network bandwidth. In some implementations, the method further includes detecting, by the transmission controller, the duration of a scheduled transmit interval and match a node ID with a source MAC address of the node of the one or more nodes associated with the network system to automatically identify a network client.

One embodiment relates to a device. The device may include one or more processors and memory storing instructions that, when executed by the one or more processors causes the one or more processors to perform operations. The operations may include receiving, a coordination packet. The operations may include obtaining, information from the coordination packet. The operations may include providing a data packet transmission schedule configured to allocate non-overlapping times to transmit a number of data packets using the information from the coordination packet. In some implementations, the operations may further include transmitting a data packet in accordance with the data packet transmission schedule.

In some embodiments, the systems and methods provide advantages over conventional Ethernet-like Carrier-Sense Multiple Access system with Collision Detection (CSMA/CD) that do not support data packet transmission based on the priority of the nodes and the packet traffic classes and that spend too much time on backoff arbitration when the traffic consists of many short packets. In some embodiments, these systems and methods avoid bandwidth degradation, unpredictable packet delivery latency and jitter, and ensure that a high-priority data packets from one node are not blocked by lower priority packets from other nodes. In some embodiments, the systems and methods are particularly advantageous in time-sensitive, time critical control networks found in industrial automation, audio-video and automotive in-vehicle networks.

Figure 10:
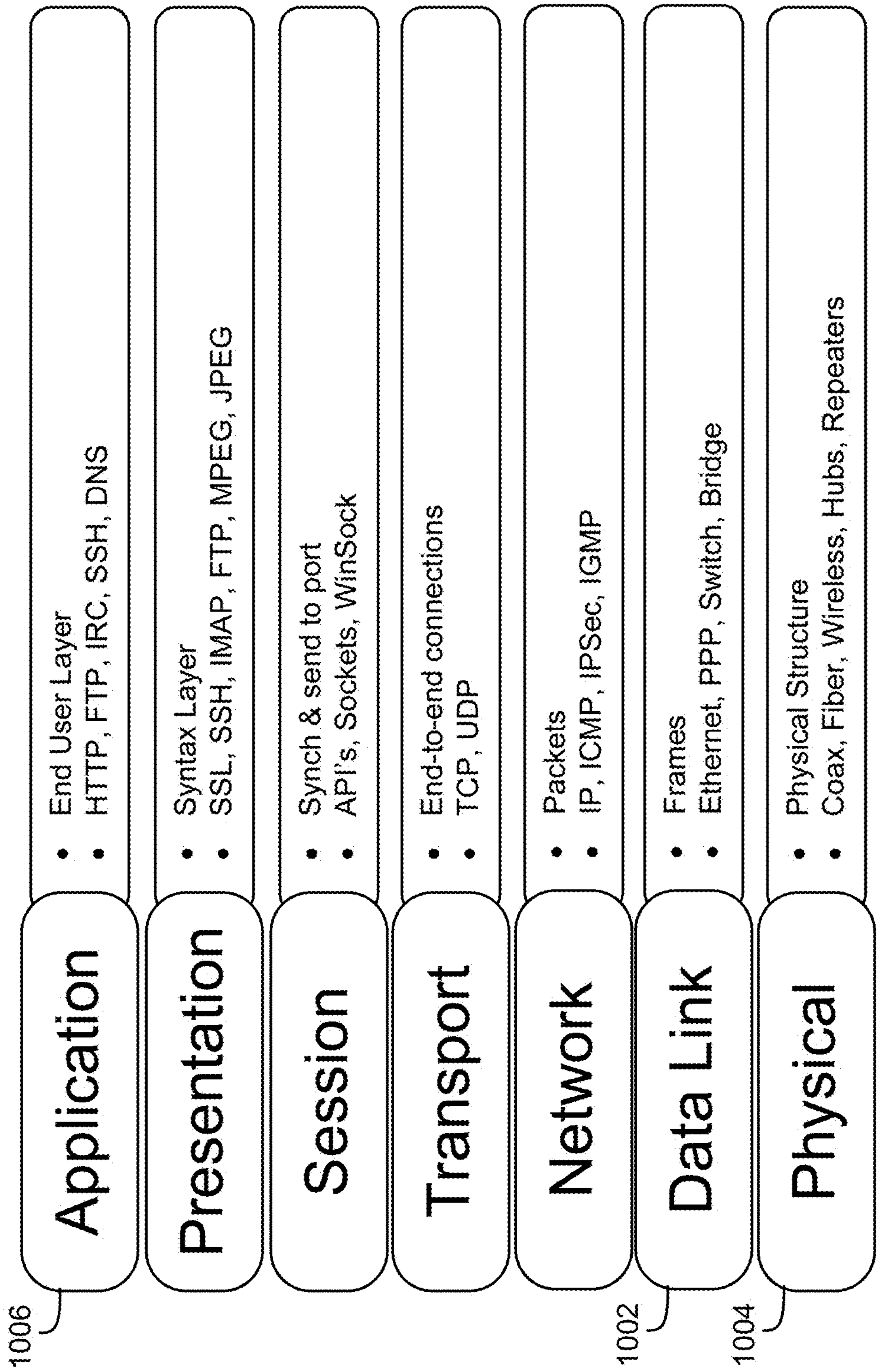
FIG. 10 is an open systems interconnection model is shown, according to an exemplary embodiment.

Referring now to FIG. 10, an open systems interconnection (OSI) model 1000 is shown, according to an exemplary embodiment. The OSI model 1000 is a 7-layer network model which defines the mechanisms that different computing systems may use to communicate with each other. The OSI model 1000 includes a data link layer 1002. The data link layer 1002 defines the functionality of the MAC. The "PMD" is represented as physical layer 1004. In some embodiments, the packets are generated by one or more applications in the application layer 1004 and passed on downwards to data link (MAC) layer 1002.

In some embodiments, the data link layer 1002 includes a transmission controller (e.g., in the Media Access Controller, MAC) which is configured to receive and decode a coordination packet and use its timing and/or content to make decisions when to select and transmit the packet from a plurality of packets delivered to MAC from applications. The transmission controller may refer to a device which controls transmission of packets in response to control information in a coordination packet in some embodiments. The transmission controller can be implemented by any circuit, software or combination thereof, including but not limited to a processor configured to receive control information and effect transmission of packets using a priority scheme. A transmission controller can be or be part of a hardware circuit, a digital signal processor, a layer, a microcontroller, an ASIC, or other device. The Frame Start Marker contains a unique data pattern which may be identifiable with a simple pattern correlator in some embodiments. The pattern correlator starts with synchronizing the unique data pattern and then identifying the Frame Start Marker code.

In some embodiments, a coordination packet may refer to any data packet which contains control information for how or when data packets should be transmitted after the coordination packet is provided. For example, in some embodiments, the coordination packet may define a minimum priority level above which the MAC or other device will release the packet to a network, the destination address/port or group of addresses which enable transmission, the size of the data packets which are currently allowed to be transmitted, and/or other packet attributes. In some embodiments, the coordination packet is or includes a Frame Start Marker which may be sent when an idle period is detected during a network transmission segment. In some embodiments, the Frame Start Marker code may include a format ID field which compactly encodes groups of such attributes directly, so that ID itself is sufficient for selection of the policy which will guide the MAC to release specific packets to network from the time when the current coordination packet is received to the time when a new coordination packet arrives based on the policy which matches to the ID of the coordination packet. In the case where the format ID field is included, the Frame Start Marker may also include additional fields as described in more detail below with respect to FIG. 5. The encoding of the policy in the compact ID field is intended to reduce bandwidth overhead incurred by coordination packets.

Referring now to FIG. 1A, a topology of a single segment bus physical media network 100 is shown according to an exemplary embodiment. The bus-like physical media network 100 includes a physical media bus 102 on which data packets are transmitted. The physical media network 100 also includes a one or more nodes 104*a*-104*n* which may be configured to send data packets associated with the node to the bus 102. The physical media may be implemented in the form of wires, coaxial cable, transmission line, optical fiber or open space, provided that the transmission from any single node 104 is seen by all nodes transparently in some embodiments. Each of the nodes may arbitrarily send data packets to the bus at varying time intervals which may lead to collisions. For example, if node 104*a* and node 104*b* attempt to transmit data packets at the same time, a collision may happen because the bus 102 state may be driven by conflicting signals. Therefore, nodes 104 are generally structured to be configured to monitor all the traffic on the bus physical media network to detect collisions and back-off and retransmit the colliding packets.

Figure 1B:
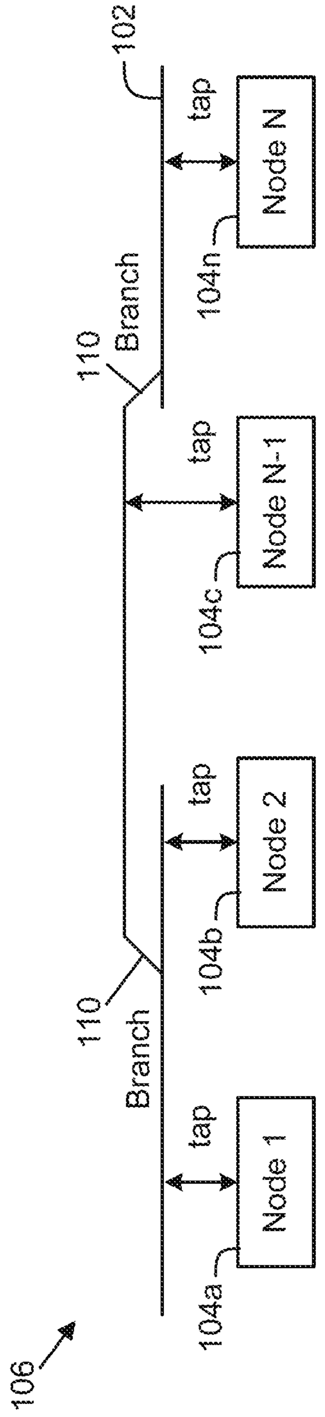
FIG. 1B a schematic block diagram of a bus physical media network topology with branches, in accordance with some embodiments.

Referring now to FIG. 1B, a multi-segment bus topology of physical media network 106 may be constructed in a practical use case, with one or more connected branches as shown according to an exemplary embodiment. The physical network 106 (e.g., bus) includes a branch 110 which is connected to node 104*c*. In some embodiments, the other nodes 104*a*, 104*b*, and 104*n* are directly connected to bus 102. Such multi-segment physical media network 106 exhibits the many of the same features as described above with respect to the bus physical media network 100 including the one or more nodes 104*a*-104*n* and the bus 102, provided that transmissions from any single node is seen by all nodes transparently, and the collisions will occur even if colliding nodes are located on different segments.

Figure 2:
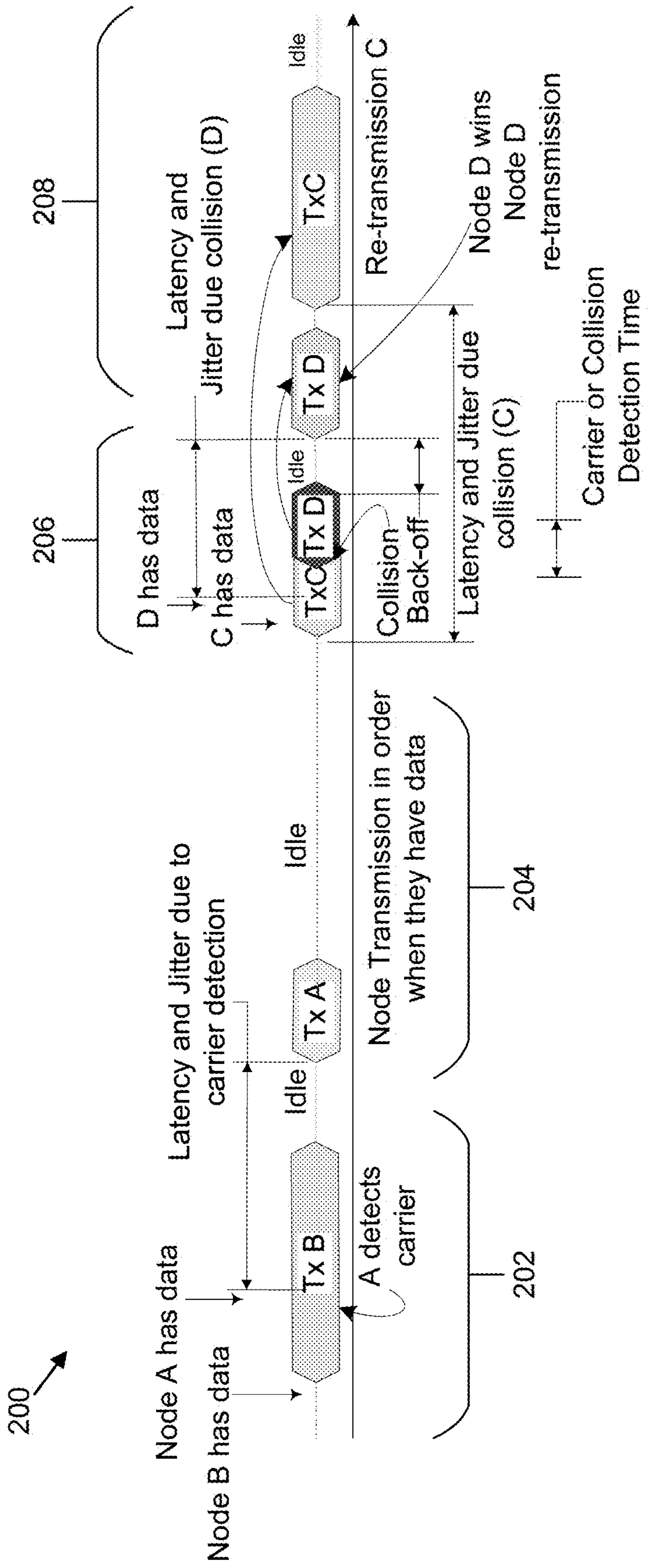
FIG. 2 is a schematic diagram of a data packet transmission segment with delivery latency, jitter, and reordering in a CSMA/CD network segment, in accordance with some embodiments.

Referring now to FIG. 2, a timing diagram of a data packet transmission segment 200 from nodes on a typical CSMA/CD network demonstrates the effects of delivery latency, jitter, and reordering due collisions during the data packet transmission segment 200. In one scenario, there may be four active nodes: Node A, Node B, Node C, and Node D. In a first time interval 202, Node B gets a large data block to transmit when the physical media is idle. Node B will begin transmission to the physical media instantly. While the data packet B is in the process of being transmitted, Node A may receive a short but urgent data packet to transmit. Since there is carrier on the bus (i.e., the data packet B is being transmitted), Node A will have to defer transmission until the end of the transmission by Node B plus time to reliably detect quiet (idle) state on the physical media. Therefore, the transmission of data packet A will happen only in time interval 204. The delayed transmission of data packet A will result in unspecified latency and delivery time jitter due to deferral. In some embodiments, the variable latency may be as short at few microseconds if the data packet B is short, and as long as few milliseconds if the data packet B is as long as the maximum allowed for a single packet. An idle state follows the transmission of the data packet A in some embodiments.

The third time interval 206 illustrates how collisions may result in transmitted packet reordering. Consider a scenario in which Node C and Node D both receive data packets to transmit shortly after each other in quick succession. Data packet C will be immediately transmitted because the physical media was idle. Since Node D received the packet before the carrier detector found transmission from Node C, Node D will also start transmission of data packet D. A collision during time interval 206 causes termination after collision detectors sense it. Then, a random backoff timeout will be started in both nodes. After the backoff interval either the data packet D or C may be randomly selected to be transmitted first. In the exemplary embodiment shown in FIG. 12, Node D is randomly selected and gets transmitted first in the interval 208, effectively reordering the original packet sequence and introducing unspecified latency and delivery time jitter.

The example CSMA/CD as demonstrated in FIG. 2 does not support priority of the nodes and the packet traffic classes, and may spend too much time on backoff arbitration when the traffic consists of many short packets, which introduces bandwidth degradation, unpredictable packet delivery latency and jitter. Additionally, the CSMA/CD as demonstrated in FIG. 2 does not guarantee that high-priority data packets from one node are not blocked by lower priority packets from other nodes. Such behavior may not be acceptable in time-sensitive, time critical control networks found in industrial automation, audio-video and automotive in-vehicle networks.

Figure 3:
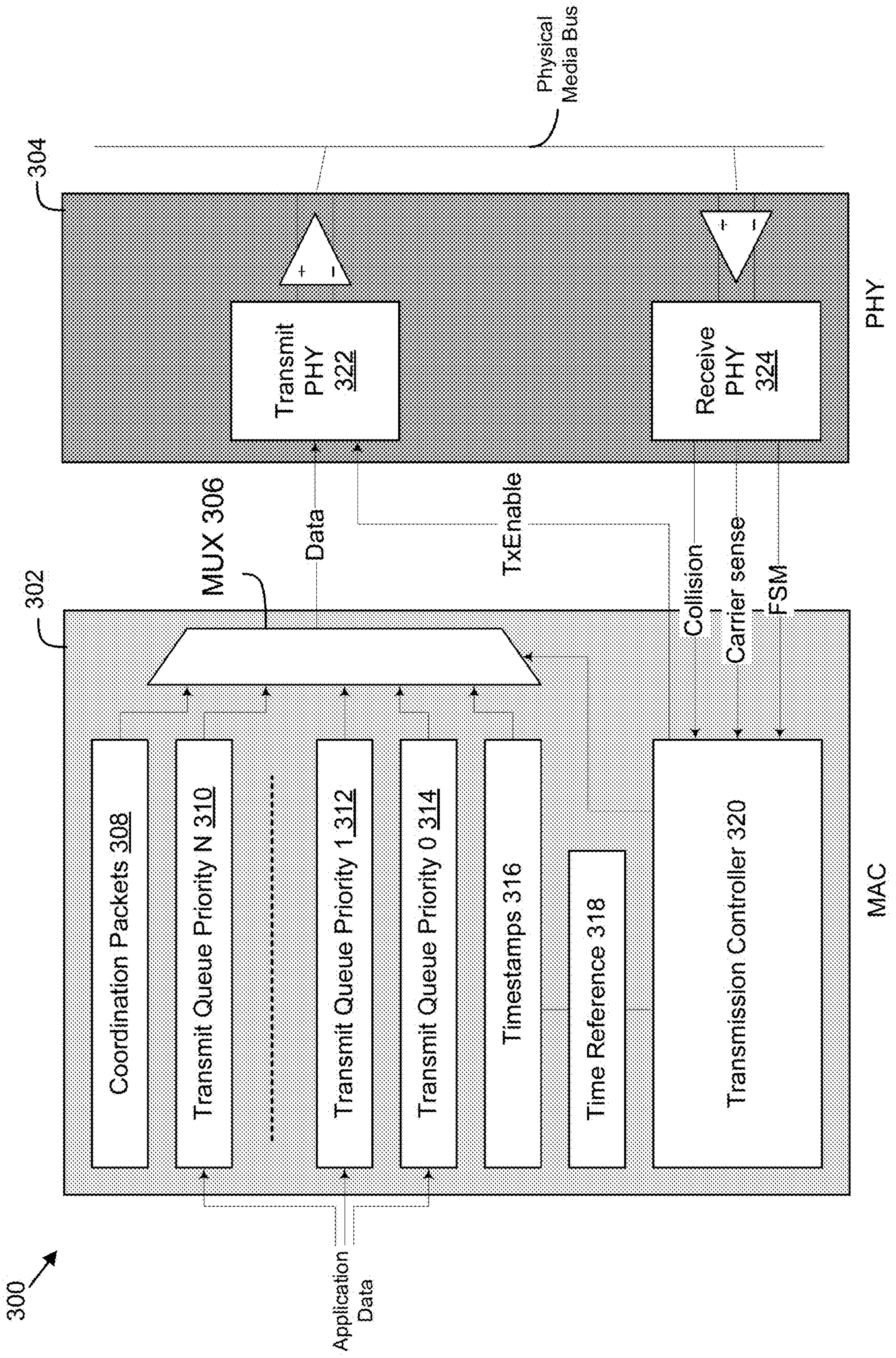
FIG. 3 is a schematic diagram of a coordinated data packet transmission system which detects and mitigates data packet transmission collisions, in accordance with some embodiments.

Referring now to FIG. 3, a block diagram of a coordinated data packet transmission system 300 is shown in accordance with an exemplary embodiment. The coordinated data packet transmission system 300 includes a media access control (MAC) layer 302 and a physical interface (PHY) layer 304. In some embodiments, the MAC 302 may be configured to monitor network traffic and coordinate data packet transmission based on collision, carrier sense and frame start marker signals from the PHY layer 304. The MAC layer 302 data stream on the PHY interface layer 304 includes the regular network data packets generated and consumed at application layer 1006, as well as the packets generated and consumed internally at MAC layer 302. In some embodiments, the MAC layer 302 may be included in the data link layer 1002 of the OSI model 1000. In some embodiments, the MAC layer 302 may be a part of the data link layer 1002 while the physical layer 304 may be part of the physical layer 1004 in the OSI model 1000. Coordinated data packet transmission system 300 can be implemented in any one or more of nodes 104*a-n* (FIGS. 1 and 2).

The MAC layer 302 may include a transmission controller 320 and a number of data buffers or facilities including buffers where upper layers place packets of different priorities (e.g., transmission queue priority levels 310, 312, 314, etc.), the local buffer or facility intended for generation of coordination packets 308, and a local buffer or facility for generation of transmission timestamps 316. The data (e.g., data packets the buffers) is released to the PHY layer 304 through a multiplexer or selector 306 which has a number of source inputs. The multiplexer selects from which source input to take data based on commands from the transmission controller 320 and sends source data to the PHY layer 304 in some embodiments.

In some embodiments, the multiplexer sources may include a unit or buffer sourcing coordination packets 308. The coordination packets 308 may include control information which may be used to coordinate data packet transmission. In some embodiments, the coordination packets 308 may take the form of packets associated with a hardware state machine, a data buffer filled by a hardware or a programmable processor, or other implementation.

In some embodiments, the coordination packets 308 may be exchanged only between MAC layers and may be blocked from propagation to higher levels on the receive path. Because the coordination packets 308 are carrying special, MAC related data, coordination packets 308 may have different format compared to regular network packets and may be significantly shorter to preserve the bandwidth. In other embodiments, the contents of coordination packets 308 may be generated by or may be visible to other system elements outside the MAC layer 302.

In some embodiments, the coordination packets may be Frame Start Markers which indicate the beginning of a data transmission frame directly. All data from after the Frame Start Marker and before the next Frame Start Marker may be part of same logical frame which the same data transmission rules, priorities, and timing may apply. The various implementations of the Frame Start Markers are described in more detail below with respect to FIG. 5.

The multiplexer inputs may also include one or more transmit queues containing packets with different assigned transmission priority levels 310, 311, and 314. When packets are present in more than one of these queues, the controller 320 will chose which of the transmit queues will provide data to the PHY layer 304 first based on the priority level of the transmit queue.

In some embodiments, the fixed priorities are assigned to queues. Usually, the transmit queue with highest priority will be first to provide data to PHY layer 304. In other embodiments, other priority schemes may be implemented. For example, an aging priority scheme may be implemented where the priority of the transmit queues may increase as time passes while the transmit queue continues to have outstanding packets which have not yet been transmitted. In this case, the transmit queue which has been holding an un-transmitted packet for the longest time may have the highest priority.

In some embodiments, the transmit queue priority may be dynamically modified based on a transmission schedule selected by the transmission controller 320. For example, in some embodiments, the node with the lowest number (e.g., Node 0), may have the highest priority. In other embodiments, the node with the highest number (e.g., Node N) may have the highest priority. Finally, in some embodiments, any node priority may be determined by a computing system separate from the coordinated data packet transmission system 300 (e.g., application software) and set by the transmission controller 320 to be the highest priority.

In some embodiments, the MAC layer 302 may contain a time reference 318 or a clock generator whose clock period is known network-wide, and the temporal coordination of events on the network may be referenced in units of such reference. In some embodiments, the time reference 318 snapshots on events in controller 320 and may optionally provide the time stamps for the packets transmitted to the network to the multiplexer or selector 306.

The transmission controller 320 may be configured to implement a data packet transmission schedule which avoids collisions between different transmissions. The schedule defines the sequence of non-overlapping time intervals, when the nodes can release (e.g., provide) the data on the PHY layer 304. The schedule applies to transmissions which are allowed in the frame following the Frame Start Marker (FSM). The schedule is shared across all nodes on the network by means of coordination packets 308, which is the packet received and interpreted by transmission controllers 320 in all nodes. In some embodiments, the coordination packets 308 may be separate broadcast packets. In other embodiments, the coordination packets 308 may be a data field included (concatenated) in the FSM. Specifically, the schedule may be encoded in the policy ID which is a compact field in FSM. In some embodiments, the fixed schedule may be provided at configuration time, and FSM is only used for delimiting frames.

The coordination packets 308 are observed and interpreted by the transmission controller 320 in all active nodes on the network. In some embodiments, the schedule from coordination packet is effective after the coordination packet is received, and is called current schedule. The current schedule may be partially or completely overridden by the schedule from newly received (next) coordination packet. In some embodiments, the coordination information may be extracted by purely hardware. In other embodiments, the coordination information may be handled by a software-programmable processor or a combination of above.

The data packet transmission schedule may refer to data that defines non-overlapping time periods for transmitting data packets while avoiding a collision in some embodiments. The data packet transmission schedule is applicable to time periods for data transmission which may be referred to as frames herein. The frames starts from the time defined in a Frame Start Marker (FSM) and may span until the next FSM transmission. In some embodiments, FSMs communicate temporal pointers to frame boundaries. In other embodiments, the appearance of FSM indicates the boundary of a frame. The frame may encompass one or more payload data packets, or may be empty. The data packet transmission schedule may be in a variety of data forms and stored in any type of storage device or circuit. A data packet transmission schedule that is configured to allocate non-overlapping times may refer to a data packet transmission schedule that includes data that defines distinct time periods for data transmission that do not intersect.

To implement the transmission schedule, the transmission controller 320 may receive information from the physical layer 304 through the receive PHY 324, including, but not limited to collision data, carrier sense, and a Frame Start Marker indicators. The information may be used to determine the boundaries of frames and how to apply schedule to transmissions. The transmission controller 320 may be configured to decode the Frame Start Marker and extract control information from the coordination packet. The control information may be defined as instructions for how data packets should be transmitted. The control information may include transmit queue priority rules, start IDs, time stamps, and error correction codes.

In some embodiments, decoding the coordination packet further utilizes a high reliability data pattern detector to improve the chance of correct detection of frame boundaries and coordination data. The high reliability is essential to make sure that all nodes on the network treat coordination data in the same manner, and avoid collisions in case that some nodes misinterpret the schedule.

A high reliability pattern detector may refer to a device configured to detect and/or decode the FSM and coordination packet based upon a data pattern in the presence of substantial noise and interference in some embodiments. In some embodiments, the coordination packet may be received from a network medium (e.g., from another node). Decoding the data packet may refer to translating the data in the coordination packet into an understandable format in some embodiments. In some embodiments, the high reliability data pattern detector includes a matched filter and an error correction unit to decode the coordination packet. In some embodiments, when the detection indicates that the FSM and coordination packet are not detected reliably, the schedule in corresponding frame is set to "void" and prevents transmissions from the node which otherwise could cause collisions. A matched filter may refer to a filter (e.g., digital filter) configured to detect the presence of certain data or enhance a signal in some embodiments.

In some embodiments, the transmit priority rules may refer to are data that provides a prioritization scheme for the transmit queue. The rules can be in a variety of formats and encompass the prioritization within the queues of an individual node (e.g., which queues to use when this node has a transmit opportunity and is allowed to drive the network medium) as well as the prioritization across all nodes on the shared segment (e.g., when transmit opportunities for each node start and end). The prioritization across all nodes defines the priority level of different nodes in some embodiments.

In some embodiments the Frame Start Marker may refer to a sequence of transmit opportunities (e.g., associated with the MAC layer 302) in some embodiments. The transmit opportunity starts from the time when the idle state (no carrier) of the medium is detected, and lasts for specified maximum time, ending with placing the medium back in idle state in some embodiments. Once one transmit opportunity ends, next may start. The schedule may define a way how each individual transmit opportunity is assigned to network nodes in some embodiments. The transmit opportunity sequence progresses until the next FSM, and then the sequence is restarted for next frame. The coordinator may issue an FSM after any of the transmit opportunities, thus terminating the current frame at any length of transmit opportunity sequence.

In some embodiments, the transmission controller 320 may also be configured to detect the duration of a scheduled transmit interval and match a node ID with a source MAC address of a node of the one or more nodes associated with the network system to automatically identify a network client. A node ID refers to an address or data that identifies a node in some embodiments. A source MAC address refers to an address of a MAC in a node in some embodiments.

In a simple, un-prioritized schedule each node may be allowed to transmit whatever it has ready in any of their queues in sequence. If the node associated with current transmit opportunity has nothing to transmit, the transmit opportunity is lost and next opportunity starts after a predefined state of idleness on the medium. For example, if a network includes 4 nodes, the Node 1 may have the highest priority (e.g., level 1) while Node 4 may have the lowest priority (e.g., level 4) or, alternatively, Node 3 may have the highest priority level and Node 1 may have the lowest priority level. Therefore the node will be activated in the order 1, 2, 3, 4 or 3, 2, 4, 1. In some embodiments, the order may be implicitly associated to the node MAC address or their enumerated order (node number) on the network.

In other embodiment, the internal priority in the nodes may be observed. For instance, in the first cycle, only nodes which have data in their high priority queues will be allowed to use transmit opportunities, and only then the nodes with lower priority packets will be allowed to use next transmit opportunities. For example, if Node 2 and Node 4 have high priority packets, and Node 1, 2 and 3 have low priority packets, the transmissions will be sent in the order Node 2, Node 4, Node 1, Node 2, and then Node 3. More flexible schedules are possible when the priority levels are communicated in coordination packet in tabular form or in bit-fields with an entry for each node and its priority level in some embodiments. Once the coordination information has been received, the transmission controller 320 may be configured to generate a data packet transmission schedule which allocates non-overlapping time intervals for transmitting the plurality of data packets to avoid collision. Non-overlapping time refers to periods of time during which data packets may be transmitted on a shared medium without colliding.

The transmission controllers 320 in all active nodes should be configured to observe the FSMs and coordination packets, detect frame boundaries and apply schedules to transmissions on shared medium during frame duration.

In some embodiments, the transmission controller 320 may also be configured to act as a coordinator node on the network, and to encode and transmit a coordination packets and/or FSMs at a predefined times. For example, a predefined time may be arbitrarily set for a certain time period (e.g., 1 millisecond, 2 milliseconds, etc.) or after a certain number of transmit opportunities have passed. Such a coordinator node may be enabled on one (primary coordinator) or more nodes (fallback coordinators). The coordination function is independent from payload data transmission, and serves to broadcast FSMs and coordination packets to all nodes. In some embodiments, the transmission controller 320 may include an encoder configured to encode and transmit the coordination packet. The encoder may be defined as a device that converts the data into an encoded version.

Figure 4:
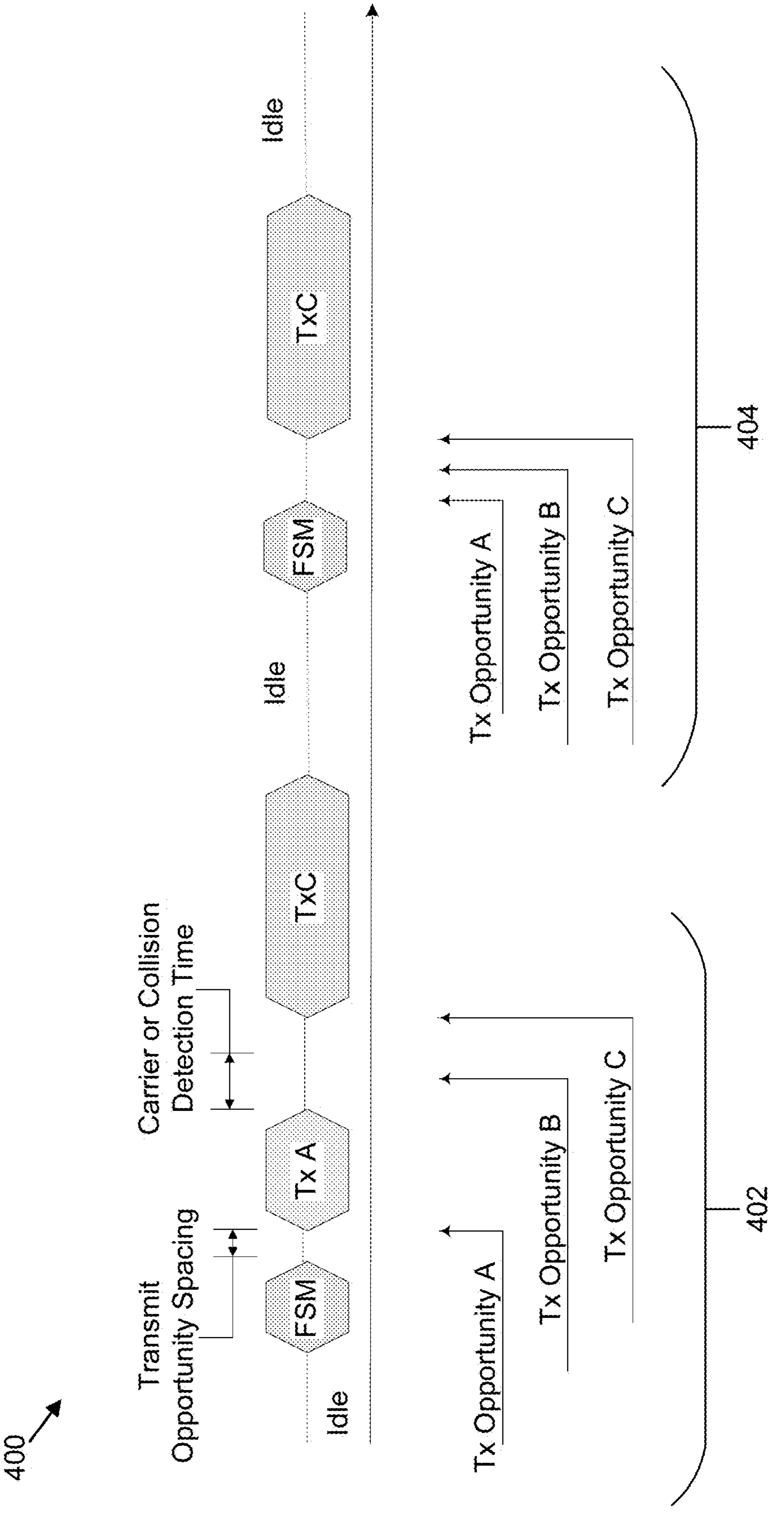
FIG. 4 is a schematic diagram of a data packet transmission segment with Frame Start Markers and traffic coordination, in accordance with some embodiments.

Referring now to FIG. 4, a time diagram of a simple transmit opportunity sequence 400 with Frame Start Markers and traffic coordination is shown in accordance with an exemplary embodiment. The Frame Start Markers may be sent periodically by one or more nodes with active coordination function, at a specific rate or when idle state of the physical media is detected. For example, in a 3-node network (A, B, C) as shown in FIG. 4, there will be three transmit opportunities in the sequence opportunities (e.g., Tx Opportunity A, Tx Opportunity B, and Tx Opportunity C). In the first frame 402, the data packet A follows FSM after a short silence for idle detection during Tx Opportunity A. After data packet A has been transmitted, a short period is allowed to pass for carrier or collision detection time before the next transmit opportunity starts. This allows the transmission controller 320 of a node with non-empty queues to determine the transmit opportunity boundaries and prevent any collisions between data packets. Then a space is enabled. Since node B does not have any data packets to transmit in Tx Opportunity B, the space is left void. Then Opportunity C starts and data packet C is transmitted. Only nodes which have data packets to transmit will transmit data packets during their corresponding transmit opportunity. Otherwise, the schedule moves on the next transmit opportunity. This process repeats in the second segment 404.

Referring now to FIGS. 5A-5D, exemplary embodiments of one or more frames are shown. As mentioned above, every frame starts with FSM that includes a synchronization pattern and format ID. The synchronization pattern may refer to a pattern for synchronizing packet transmission with the time reference 318 in some embodiments. The FSM is sent by coordinator function in one of the nodes acting as coordinator. The Frame Start Marker may contain a unique data pattern which may be identifiable with simple pattern correlator. The content of FSM differentiates the coordination packet from other data packets being transmitted on the network in some embodiments. In some embodiments, the FSMs may additionally include one or more additional fields such as an optional start ID, an optional transmit ID map, an optional timestamp, and an optional error correction code.

Figure 5D:
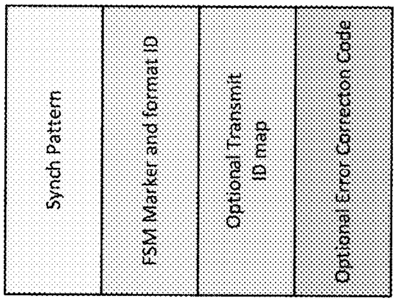
FIGS. 5A-5D are schematic block diagrams of exemplary embodiments of the Frame Start Markers illustrated in FIG. 4, in accordance with some embodiments.
Figure 5C:
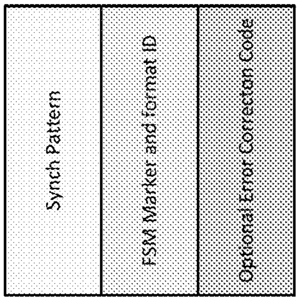
Figure 5B:
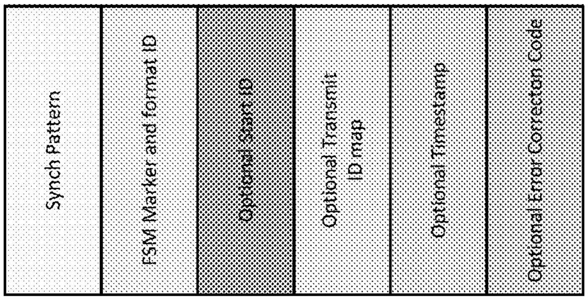
Figure 5A:
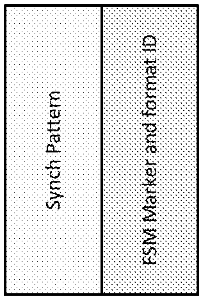

In some embodiments, the Frame Start Marker includes other fields. The FIG. 5A shows format ID field that identifies that the coordination packet as included or immediately following FSM, and which specifies the schedule for the transmit opportunities for the nodes. The coordination packet can include information for a transmit schedule. In some embodiments, the information includes the transmit schedule or parameters for making the transmit schedule.

In some embodiments, the optional start ID (FIG. 5B) may refer to an indication of which node receives the first priority and therefore the first transmit opportunity in some embodiments. This field allows to change the order in which nodes use transmit opportunities in every frame individually.

Figure 8:
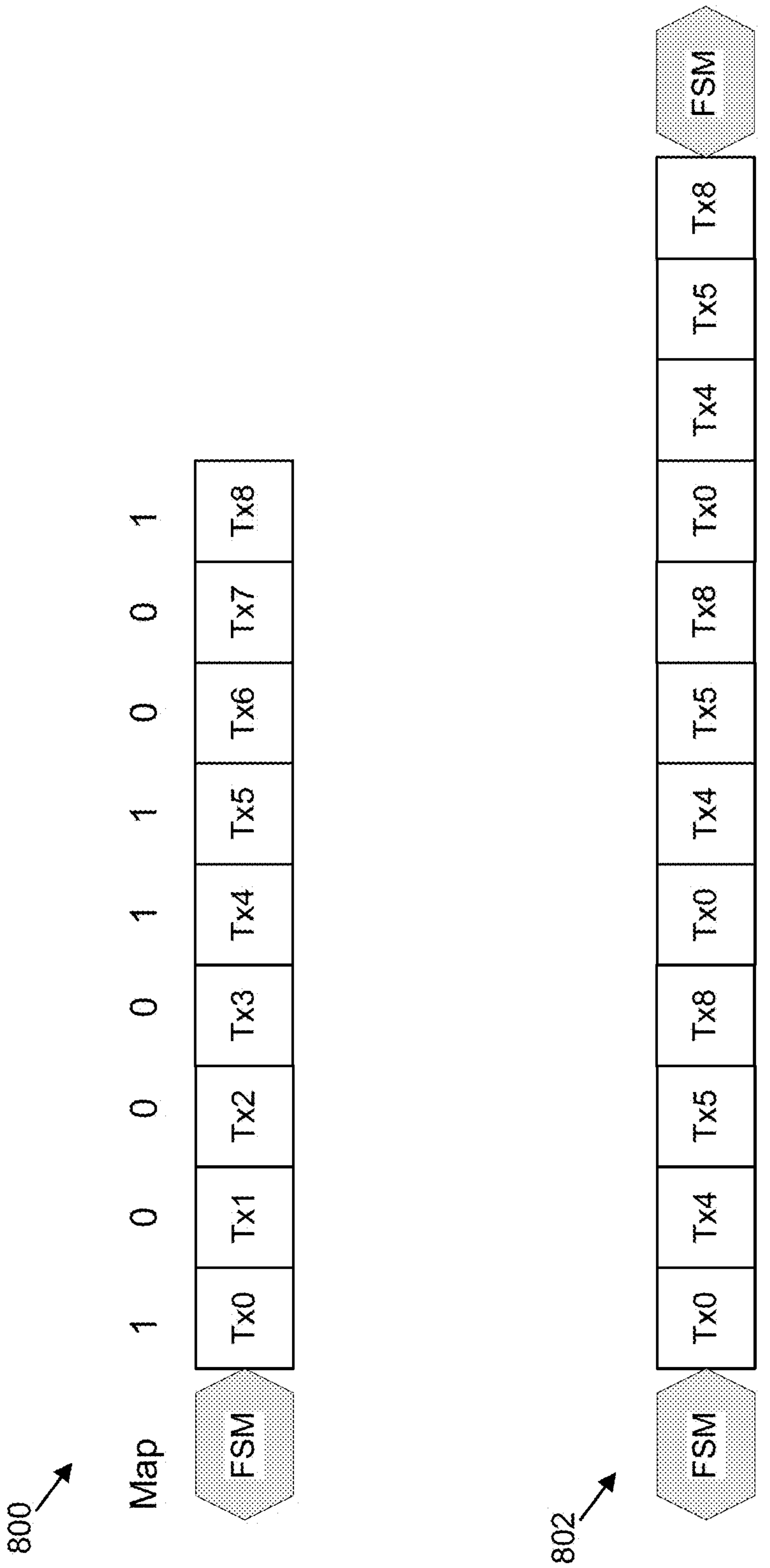
FIG. 8 is a schematic diagram of a transmit opportunity map, in accordance with some embodiments.

In some embodiments, the schedule is described by a map that indicates the sequence of transmit opportunities for nodes. For example, referring now to FIG. 8, The FSM includes a transmit opportunity bitmap 800, a pattern of 100011001 where each '1' bit stands for allowing corresponding node to transmit data. When the transmit ID map is present in the FSM, the transmissions from some of the nodes will be disallowed (i.e., not able to transmit data packets). In this example, with transmit ID map pattern of 100011001, map 800 only allows transmission for Node 1, Node 4, Node 5, and Node 8 in the temporal sequence 802. Since the sequence is wrapped around on the completion and reset only by new FSM, the actual transmit opportunity sequence 802 is demonstrated in FIG. 8. The pattern in the next FSM may be different at the discretion of coordinator, so the order of collision-less accessing shared medium may be dynamically changed as appropriate to the application.

In some embodiments, the optional time stamp field may refer to an indication of the time when the Frame Start Marker appeared on the media in some embodiments. The time stamp field in a Frame Start Marker is intended for accurate timebase synchronization to the timebase found in the each node's MAC layer 302. By comparing the times of transmission (from FSM's Timestamp field) to the time of reception of FSM, each node can determine the timing error of this node's local clock generator and adjust it to match the timebase located in coordinator node.

In some embodiments, the Frame Start Markers may include the snapshot of the timebase counter counting reference clock in the master coordinator (e.g., the node which sends Frame Start Marker) at the time when the Frame Start Marker correlation function reaches its peak. Since this time is already in the past from the time when the time stamp field will appear on the physical media, the coordinator will pipeline the process and insert the time stamp captured for the previous Frame Start Markers. The follower nodes must capture their local times at the moment of correlation peak, and temporarily store it until the next Frame Start Marker arrives and delivers the time for the previous FSM from the master coordinator. At that moment, each node may compare the local and remote time stamps and use the difference as an error signal for frequency or phase tracking loops.

In some embodiments, the timebase clocks may be unrelated and asynchronous to the network clock, and its frequency may need to be accurately recovered in one or more nodes. One of such applications will be transmitting audio or accurate position of camshaft in a vehicle. In some embodiments, one or more clock recovery loops may exist and operate concurrently, using timestamp data.

Any implementation of network and application clock synchronization based on timestamps is possible. The accurately synchronized timebases guarantee that the temporal references to transmit opportunities are identically encountered by all nodes to avoid collisions due to mis-coordination in some embodiments.

In some embodiments, the optional error correction code covering coordination packet data may mitigate errors in the coordination data packets. An error correction code may refer to data that indicates an error in some embodiments. Since the faults in coordination may result in system-wide collisions and bandwidth degradation, the reliability of FSM and coordination data reception may need to be higher than that of regular payloads. An error correction unit may refer to a circuit or software or combinations thereof that correct errors or provide an error correction code. In some embodiments, the error correction code may be in the form any commonly used error correction codes (e.g., hamming, binary convolution codes, Reed-Solomon code, low density parity check code, etc.). The format ID may be flexible enough to allow different valid combination of above mentioned fields as shown (but not limited to) in FIGS. 5C and 5D.

Figure 6:
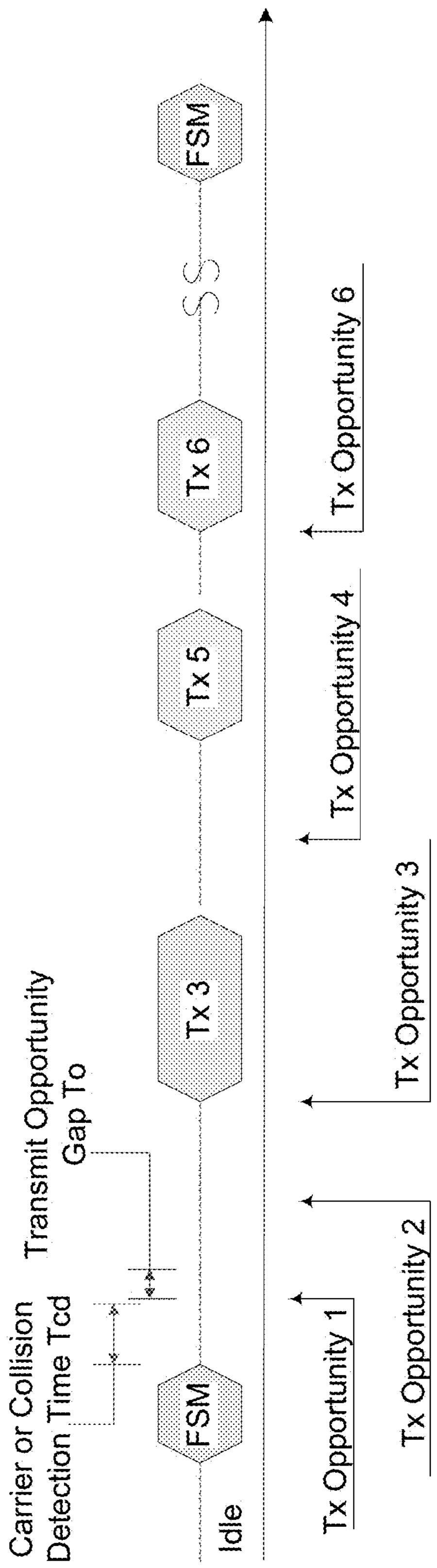
FIG. 6 is a schematic diagram of a data packet transmission segment which illustrates the timing of transmit opportunities, in accordance with some embodiments.

FIG. 6 illustrates the timing of transmit opportunities in simple carrier sense with collision avoidance modes implemented in transmission controller 320. Transmission controller 320 observes coordination packets and tracks the temporal location of all transmit opportunities in some embodiments. In one embodiment, the transmit opportunities may be equally spaced after the idle state of the physical media and assigned to the network nodes per their MAC address or enumeration ID. The nodes on the shared network segment may be assigned unique identifiers, allowing the nodes to match them to the transmit opportunities. The duration of transmit opportunity may be specified in the time units commonly known to all nodes, and may optionally be made programmable. All nodes on the network initially listen to detect the Frame Start Markers in some embodiments. Only the nodes that detect a valid Frame Start Marker will know the schedule and can find their transmit opportunity start time in some embodiments. Each node has a current transmit opportunity register which is loaded by the start identification number (e.g., start ID) field value from Frame Start Marker (if present) or cleared immediately if the field is not present. Assuming that the collision detection time is $T_{cd}$, and the transmit opportunity guardband is $T_o$, then each transmission controller 320 may determine a transmit opportunity as described below.

If the current value of the register matches the ID of this node, and there is outstanding data in the transmit queues of the MAC layer 302, the transmission controller 320 will start sending selected priority queue packet data to PHY 304 and the data will appear on the medium. If no data is available in the queues, the transmitter will remain idle and the transmit opportunity will stay unused. If controller 320 encounters the gap with no carrier for timeout $T_{cd}+T_o$ (transmit opportunity spacing), the value of the transmit opportunity register is incremented and this process is repeated for each transmit opportunity. The timeout for carrier detection is marked in green in FIG. 6, and $T_o$ is marked as red traces. In the exemplary embodiments shown in FIG. 6, transmit opportunities 1, 2, and 4 are unused, and active transmissions occur on transmit opportunities 3, 5, and 6. If none of the optional fields are defined in the Frame Start Marker, and the node has data to transmit, the node's MAC will see transmit opportunities as shown above, and always in sequential order (1,2,3, . . . N), and then the cycle will repeat.

Figure 7:
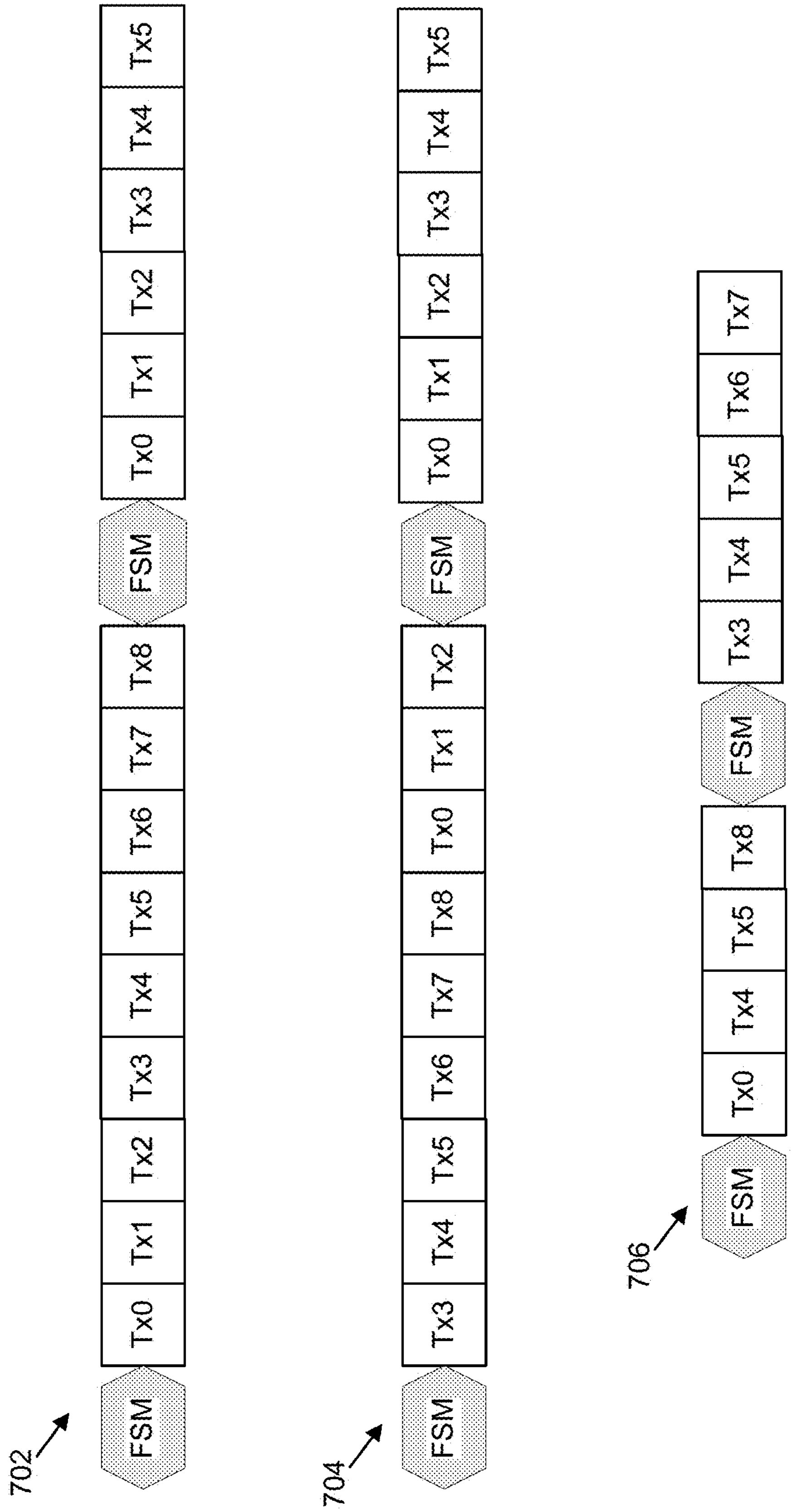
FIG. 7 shows schematic diagrams which illustrate different transmit opportunity sequences, in accordance with some embodiments.

A simple sequential schedule may place nodes with higher IDs always at disadvantage of being last and having to wait if earlier opportunities are occupied by long packets. Referring now to FIG. 7, the sequence identifier field in FSM may modify the order in different frame instances. Transmit opportunity sequence 702 demonstrates a default transmit sequence. In the default transmit sequence, the sequence of transmit opportunities starts from a first transmit ID (e.g., ID0) and increments the transmit ID number until the maximum transmit ID is reached.

Transmit opportunity sequence 704 demonstrates a sequence in which a specific StartID is specified in FSM's optional StartID field. When the specific StartID is defined in the Frame Start Marker, the transmit opportunity sequence will start at the ID that matches the StartID, and wraps around at the maximum ID as shown in FIG. 7, thus the sequence of transmissions from the nodes may change after each Frame Start Marker. The MAC coordination function can rotate priority by changing the StartID on every cycle.

Transmit opportunity sequence 706 demonstrates the use of transmit opportunity map field for selective polling, where only critical nodes are allowed to send data in each frame. In the example, first frame is allocated to allow nodes 0, 4, 5, 8 only, and then second frame is allocated for nodes 3, 4, 5, 6, 7. The application defines which order of transmit opportunities is most efficient for a specific system.

The simple schedule may create excess delays for transmitting urgent data from nodes with high IDs, if the lower ID nodes have a lot of data to transmit. The transmissions from higher ID nodes will be always delayed, especially if these earlier transmit opportunities will be loaded with large packets.

In enhanced embodiment, MAC layer 302 can prevent this from happening if it is allowed to observe the duration of previous transmit opportunities from other nodes, and jam the transmission of a long packet if it has an urgent, time-critical packet to transmit out of original sequence. More specifically, if an urgent transmission is outstanding in the queue of the node may insert a jamming burst in the earlier transmit opportunity. As the result, the node with lower ID will detect a collision and quickly gets off the shared medium, and waits for the next Frame Start Marker. But the sequence of transmit opportunities within current frame will continue for all other nodes and the eventually the urgent packet will go through earlier.

Figure 9:
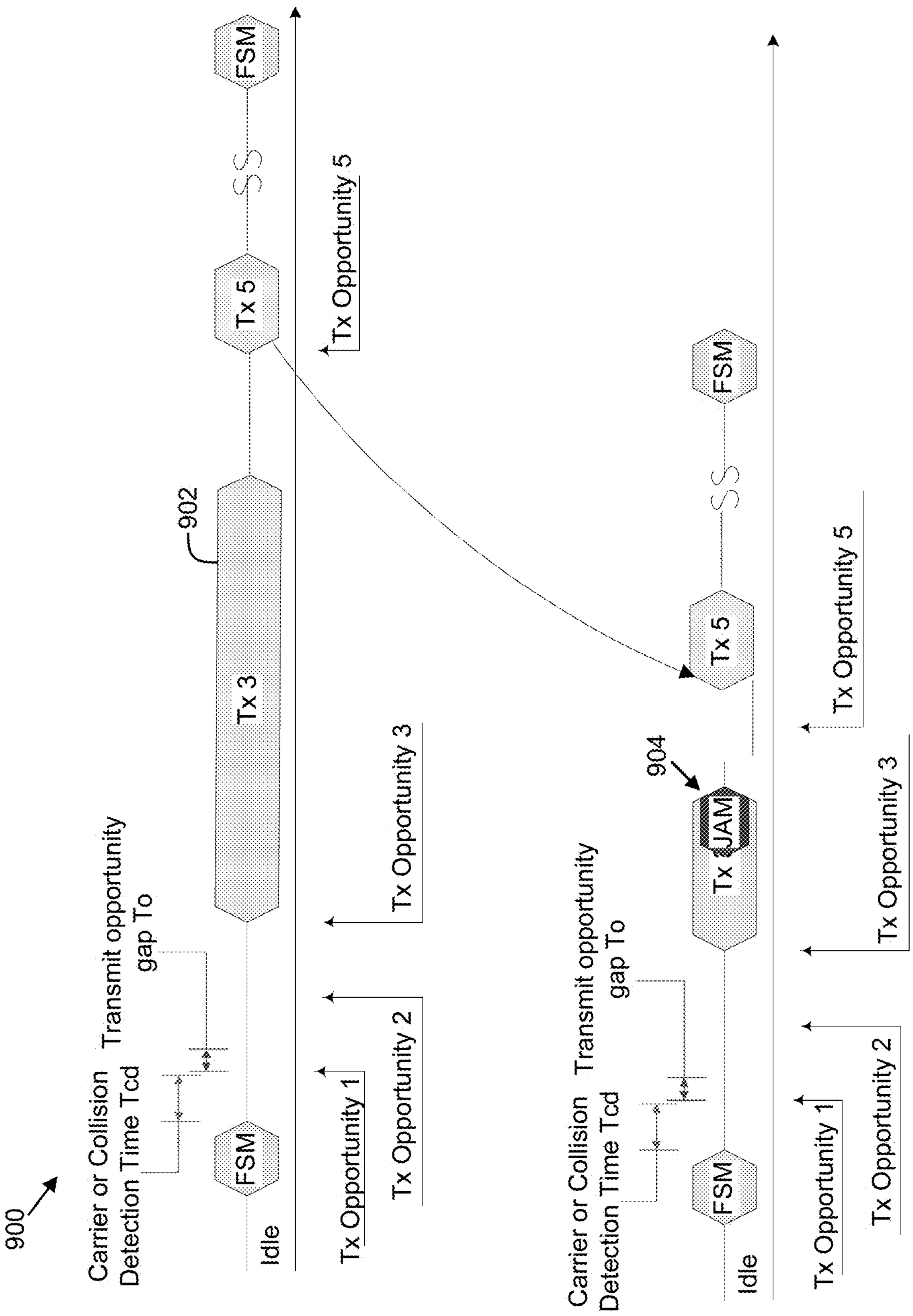
FIG. 9 is a schematic diagram of a data packet transmission segment which illustrates a jamming mechanism to pre-empt the transmission of a data packet, in accordance with some embodiments.

Referring now to FIG. 9, time sequence 900 illustrates a jamming mechanism to pre-empt the transmission of a long data packet in an exemplary embodiment. Specifically, the transmission controller 320 may collect usage statistics for each node to detect a duration and use of a transmit interval and then temporarily exclude a transmit opportunity for selected nodes by implementing the jamming mechanism to preempt the monopolization of network bandwidth. Network bandwidth ay refer to communication capacity on the network or any part thereof in some embodiments. The usage statistics may refer to metrics collected from each of the nodes which describe when each node transmits data, the duration of transmission, and the type of data, among other types of usage statistics in some embodiments. The node 3 with long data packet will push out urgent transmission from node 5 when pre-emption by jamming is not enabled. The system will experience excess delay and delivery time jitter for Node 5. A jamming mechanism may refer to a circuit, software or combination thereof that stops transmission of a data packet by initiating a controlled collision in some embodiments. A controlled collision may refer to a process that sends a data packet that results in two nodes sending a data packet on the network medium at the same time (e.g., resulting in a collision) in some embodiments.

The transmission controller 320 in Node 5 may implement pre-emption by jamming to prevent monopolization. Monopolization may refer to the continued use of the shared media for transmitting a data packet (for overly long periods of time) of the network bandwidth in some embodiments. If it sees the outstanding urgent packet in its high priority queue level 310 at the time when Node 3 is using its transmit opportunity for a long, low priority packet 902, it may inject a jamming sequence 904 to create an intentional or controlled collision. In response to collision, the transmission controller 320 in Node 3 will terminate transmission and will hold the packet for later retransmission. After that, the transmit opportunity for Node 5 will start earlier and the delay for urgent packet will be reduced.

As an extension of this method, a transmission controller 320 in Node 5 wishing to override normal priority may consider to insert a jam sequence in the earlier transmit opportunities before their assigned nodes will start their transmissions. Since transmission controllers 320 in all nodes are keeping track of transmit opportunity boundaries by detecting the carrier burst followed by idle state (see FIG. 4), the jam burst will be treated as occupied short transmit opportunities. The lower priority nodes will assume that the TOs are used, and will not attempt to transmit. This situation is equivalent to "fast forward" to transmit opportunity for high-priority packet from Node 5, and temporary suppressing transmissions from earlier nodes. Such suppression may be allowed only for the nodes whose queues have high priority packets, and if priority is equal in the nodes, the normal, sequential schedule of transmit opportunities will resume.

Since transmission controller 320 must observe coordination packets and must track the temporal location of all transmit opportunities, and all packets on the shared medium are visible and can be received in every node, the transmission controller 320 together with MAC receiver may monitor utilization of each transmit opportunity, and collect statistics of utilization (including, but not limited to number of packets, bandwidth used by each node, source MAC address, size of packets, priority level). It also can automatically discover a mapping between MAC address and Node ID by tracking the address field of the packets sent on each transmit opportunity. The collected statistics and mapping may be made available to the application layer.

The term "coupled" and variations thereof includes the joining of two members directly or indirectly to one another. The term "electrically coupled" and variations thereof includes the joining of two members directly or indirectly to one another through conductive materials (e.g., metal or copper traces). Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It should be noted that certain passages of this disclosure can reference terms such as "first" and "second" in connection with system components (e.g., nodes, transmit opportunities, etc.). These terms are not intended to merely relate entities (e.g., a first device and a second device) temporally or according to a sequence, although in some cases, these entities can include such a relationship. Nor do these terms limit the number of possible entities that can operate within a system or environment. It should be understood that the systems described above can provide multiple ones of any or each of those components and these components can be provided on either a standalone machine or, in some embodiments, on multiple machines in a distributed system. In addition, the systems and methods described above can be provided as one or more computer-readable programs or executable instructions embodied on or in one or more articles of manufacture, e.g., a floppy disk, a hard disk, a CD-ROM, a flash memory card, a PROM, a RAM, a ROM, or a magnetic tape. The programs can be implemented in any programming language, such as LISP, PERL, C, C++, C #, or in any byte code language such as JAVA. The software programs or executable instructions can be stored on or in one or more articles of manufacture as object code.

While the foregoing written description of the methods and systems enables one of ordinary skill to make and use embodiments thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A device comprising:
- a transceiver configured to:
  - detect an idle period of a network medium; and
  - transmit a Frame Start Marker that identifies a coordination packet in response to detecting the idle period; and
- a transmission controller configured to:
  - detect the Frame Start Marker that identifies the coordination packet;
  - receive the coordination packet from the network medium;
  - obtain information from the coordination packet; and
  - provide a data packet transmission schedule configured to allocate non-overlapping times to transmit a plurality of data packets in response to the information from the coordination packet.

2. The device of claim 1, wherein the transmission controller is configured to act as network coordinator.

3. The device of claim 2, wherein the coordination packet comprises a transmit opportunity for one or more nodes configured to communicate on the network medium.

4. The device of claim 3, wherein the coordination packet specifies a prioritization scheme for the transmit opportunity for the one or more nodes.

5. The device of claim 4, wherein the coordination packet describes a jamming mechanism configured to initiate a controlled collision in response to at least the prioritization scheme.

6. The device of claim 4, wherein the prioritization scheme increases a priority of one or more data packet based on a duration of time spent in a transmit queue.

7. The device of claim 5, wherein the transmission controller is configured to:
- collect usage statistics for each node to detect a duration and use of a transmit interval; and temporarily exclude a transmit opportunity for selected nodes by implementing the jamming mechanism to preempt monopolization of network bandwidth.

8. The device of claim 1, wherein the coordination packet comprises at least one of a synchronization pattern, the Frame Start Marker, a start identification number, a time stamp, and an error correction code.

9. The device of claim 1, wherein the transmission controller comprises a matched filter and an error correction unit configured to obtain the information.

10. The device of claim 3, wherein the transmission controller is configured to detect a duration of a transmit opportunity and match a node ID with a source MAC address of a node of the one or more nodes communicating on the network medium to identify a network client.

11. A method for data packet transmission, the method comprising:

detecting, by a transceiver of a device, an idle period of a network medium;

transmitting, by the transceiver, a Frame Start Marker that identifies a coordination packet in response to detecting the idle period;

detecting, by a transmission controller of the device, the Frame Start Marker that identifies the coordination packet;

receiving, by the transmission controller, the coordination packet;

obtaining, by the transmission controller, information from the coordination packet;

providing, by the transmission controller, a transmission schedule configured to allocate non-overlapping times using the information from the coordination packet; and transmitting, by the transmission controller, a data packet according to the transmission schedule.

12. The method of claim 11, the transmission controller further comprises an encoder configured to encode the coordination packet.

13. The method of claim 12, wherein the coordination packet describes a transmit opportunity for one or more nodes associated with a network system.

14. The method of claim 13, wherein the coordination packet specifies a prioritization scheme for the transmit opportunity for the one or more nodes associated with the network system, or a jamming mechanism which is configured to initiate controlled collisions as required by at least the prioritization scheme.

15. The method of claim 14, further comprising:

collecting, by the transmission controller, usage statistics for each node to detect a duration and use of a transmit interval; and temporarily excluding, by the transmission controller, a transmit opportunity for selected nodes by implementing the jamming mechanism to preempt monopolization of network bandwidth.

16. The method of claim 12, wherein the coordination packet comprises at least one of a synchronization pattern, a Frame Start Marker code, a start identification number, a transmit identification map, a time stamp, and an error correction code.

17. The method of claim 15, further comprising detecting, by the transmission controller, the duration of a scheduled transmit interval and match a node ID with a source MAC address of the node of the one or more nodes associated with the network system to automatically identify a network client.

18. A device, comprising:

one or more processors and memory storing instructions that, when executed by the one or more processors causes the one or more processors to perform operations comprising:

detecting an idle period of a network medium;

transmitting a Frame Start Marker that identifies a coordination packet in response to detecting the idle period;

detecting the Frame Start Marker that identifies the coordination packet;

receiving the coordination packet;

obtaining information from the coordination packet; and providing a data packet transmission schedule configured to allocate non-overlapping times to transmit a plurality of data packets using the information from the coordination packet.

19. The device of claim 18, wherein the operations further comprise transmitting a data packet in accordance with the data packet transmission schedule.

20. The device of claim 18, wherein the coordination packet specifies a prioritization scheme for the transmit opportunity for one or more nodes associated with a network system.

* * * * *